Dec. 11, 1923.  
J. FOLK  
SLICE COLLECTOR FOR SLICING MACHINES  
Filed June 12, 1922
1,477,254
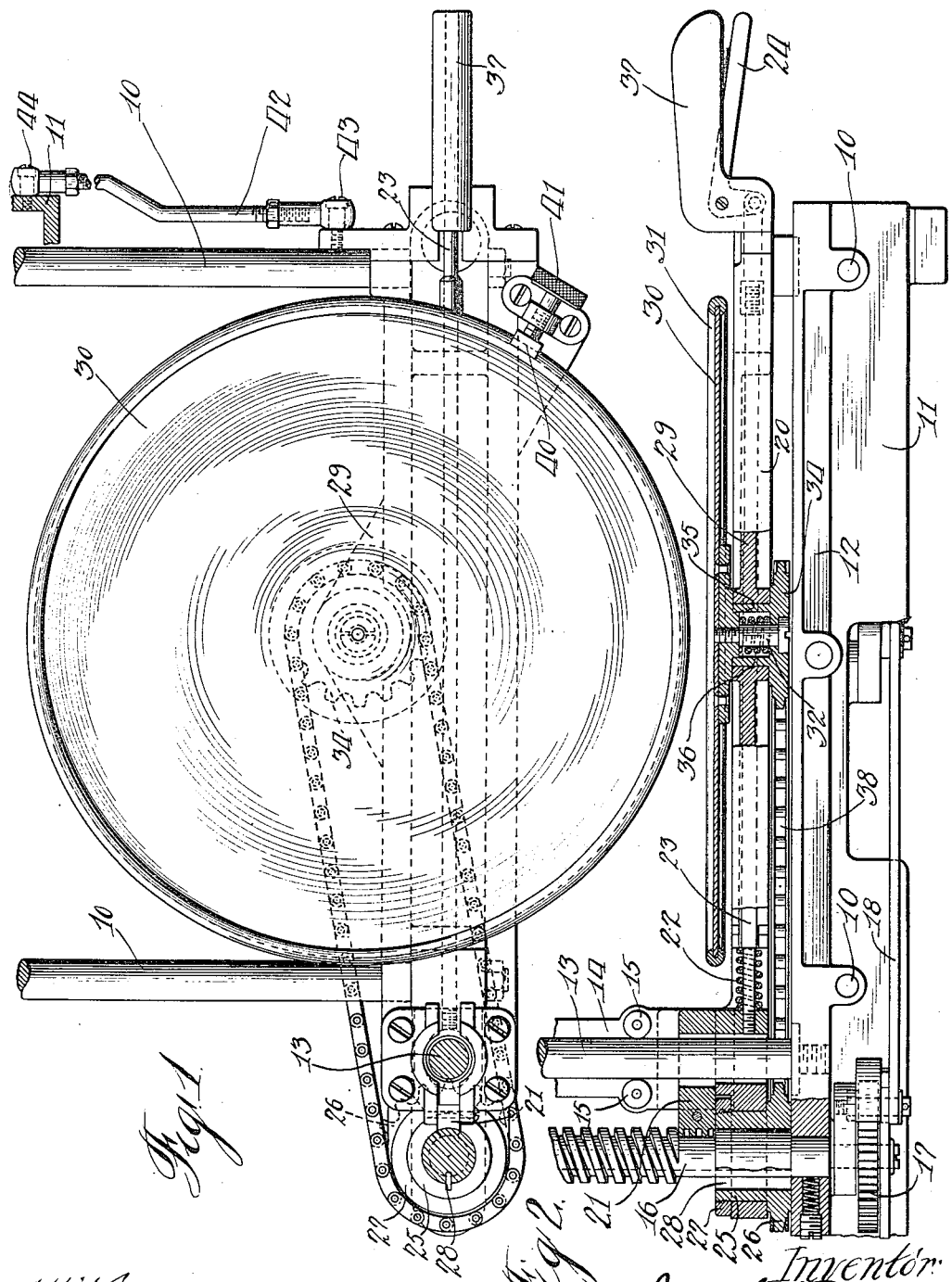

Patented Dec. 11, 1923.

1,477,254

UNITED STATES PATENT OFFICE.

JOSEPH FOLK, OF LAPORTE, INDIANA, ASSIGNOR TO U. S. SLICING MACHINE COMPANY, OF LAPORTE, INDIANA, A CORPORATION OF INDIANA.

SLICE COLLECTOR FOR SLICING MACHINES.

Application filed June 12, 1922. Serial No. 567,537.

*To all whom it may concern:*

Be it known that I, JOSEPH FOLK, a citizen of the United States, residing at Laporte, in the county of Laporte and State of Indiana, have invented certain new and useful Improvements in Slice Collectors for Slicing Machines, of which the following is a specification.

This invention relates to a machine of the general type shown in Patent No. 1,376,775, granted May 3, 1921, and has special reference to the slice-receiving table for such a machine.

The invention has for its object the provision of a table upon which the slices may be automatically arranged in an attractive manner for display purposes and also the provision of a device of the class named which shall be of improved construction and operation.

The invention is exemplified in the combination and arrangement of parts shown in the accompanying drawing and described in the following specification, and it is more particularly pointed out in the appended claims.

In the drawing—

Fig. 1 is a top plan view of a slice collector embodying one form of the present invention; and Fig. 2 is an elevation of the device shown in Fig. 1 with parts in section.

For supporting the slice collector, a pair of rods or bars 10 project from the frame 11 of the slicing machine and support a cross bar 12 having a standard 13 projecting upwardly at one end thereof. A runner 14 is provided with rollers 15 for traveling on the standard 13 and a vertical screw 16 is arranged parallel with the standard 13 for moving the runner 14 up and down along the standard in the manner fully explained in the patent above referred to. Ratchet mechanism 17 operated by a bar 18, as fully explained in that patent, drives the screw 16.

The runner 13 carries a frame 20 rigidly connected thereto and extending parallel with the bar 12. A threaded detent or half nut 21 is slidably mounted on the frame 20 adjacent the screw 16 in position to engage the threads on the screw. A coil spring 22 normally presses the half nut into engagement with the screw and a rod 23 is connected with a lever 24 at the opposite end of the frame by which the half nut may be disengaged from the screw. Surrounding the screw 16 and journaled in the end of the frame 20 is a sleeve 25 having a sprocket 26 arranged below the frame 20. A nut 27 holds the sleeve in place in its bearing in the frame 20. A sliding key 28 causes the sleeve and sprocket 26 to rotate in unison with the screw 16 but permits vertical movement of the sleeve along the screw when the frame 20 is moved up or down.

A bracket 29 is secured in the rear of the frame 20 about centrally thereof and has journaled thereon a disc-shaped plate or table 30. The edge of the table may be reinforced in any suitable manner as by a bead 31. The table 30 is connected by a screw 32 to a sprocket wheel 34 arranged beneath the frame 20. The sprocket wheel 34 is provided with a sleeve 35 which rotates in a bearing in the bracket 29. A spring 36 surrounds the screw 32 and bears frictionally upon the sprocket 34 and lower face of the table 30 thus providing a frictional drive between the sprocket and table, but permitting relative movement of the two if sufficient force is exerted to cause such movement.

A blank space at the lower end of the thread on the screw 16 permits rotation of the screw when the table is in its lowermost position without moving the table. In the usual operation the frame 20 and receiving table 30 are lifted to their uppermost position by grasping the handle 37 and lever 24 and moving the entire mechanism carried on the frame 20 to its uppermost position, in which position the half nut 21 is permitted to engage the screw 16. The machine is then driven in the usual manner, as explained in the prior patent referred to above, and slices are deposited upon the rotary table 30. After the deposit of each slice the screw 16 is given a partial rotation which moves the table downwardly the thickness of a slice. This rotation will at the same time drive the sprocket chain 38 which connects the sprockets 26 and 34 and thus impart an angular movement to the table 30. This will angularly displace the slices previously deposited prior to the deposit of the next slice. The slices will thus be caused to assume fanciful positions on the plate giving an attractive appearance for display purposes. The effect may be varied according to the position that the slices are deposited upon the table. This would depend upon the height of the material on the slicing machine or the horizontal position of the table. If the slices are deposited centrally upon the table, the slices will have something of the appearance of a rosette. If the slices are deposited in front or in rear of the center of the table, the slices will assume a circular position. It will be apparent to those skilled in the art that the table may be given an elliptical movement or that other movements may be imparted to the table to produce various effects by the deposited slices.

A brake shoe 40 operated by a thumb screw 41 is provided for holding the table against rotary movement. When the thumb screw is tightened the frictional drive between the sprocket 34 and the table will permit the table to be held in fixed position. In this way the slices may be deposited in a regular stack upon the table in the manner of the stacker in the patent previously referred to. In that patent there was shown a post adjacent the operating handle for the table to prevent the table from swinging about the feed screw. In the present case a radius rod 42 is pivoted to the frame 20 at 43 and to the slicing machine frame at 44 to guide the table in its vertical movement. This prevents any interference that the vertical rod shown in the prior patent may have with the easy access to the table.

I claim:—

1. The combination with a slicing machine, of a receiving table therefor, means for imparting vertical movement to said table, and means for imparting horizontal movement thereto.

2. The combination with a slicing machine, of a receiving table therefor, means for imparting periodic limited vertical movements to said table, and means for imparting periodic limited horizontal movements thereto.

3. The combination with a slicing machine, of a slice-receiving table therefor, and means for imparting horizontal rotary movements to said table.

4. The combination with a slicing machine, of a slice-receiving table therefor, and means for imparting limited angular movements thereto in the direction of the plane of the table.

5. The combination with a slicing machine, of a receiving table therefor, means for periodically imparting limited rotary movements thereto, and means for periodically imparting limited vertical movements to said table.

6. The combination with a slicing machine, of a receiving table therefor, and means for simultaneously imparting movement to said table both vertically and horizontally.

7. The combination with a slice-receiving table, of means for periodically depositing slices thereon and means for imparting rotary movement thereto about an upright axis in timed relation with the deposit of said slices therefor.

8. The combination with a slicing machine, of a slice-receiving table therefor, and mechanism for simultaneously imparting rotary and vertical movements to said table in timed relation to the deposit of slices upon said table.

9. The combination with a slicing machine, of a slice-receiving table therefor, and mechanism for imparting both vertical and horizontal movements to said table in timed relation to the deposit of the slices upon said table.

10. The combination with a slice-receiving table, of means for periodically imparting limited vertical movements to said table, and means connected with said first-mentioned means and actuated in unison therewith for imparting limited horizontal movements to said table.

11. The combination with a slice-receiving table, of a feed screw for imparting vertical movement to said table, and means operatively connected with said feed screw for imparting a horizontal movement to said table.

12. The combination with a rotary slice-receiving table, of a feed screw for moving said table vertically, ratchet mechanism for actuating said feed screw, and mechanism driven by said feed screw for moving said table horizontally, said means being arranged to permit vertical movement of said table while said table remains stationary as to horizontal movement.

13. The combination with a rotary slice-receiving table, of a feed screw for moving said table in a vertical direction, ratchet mechanism for periodically actuating said feed screw, means actuated by said feed screw for rotating said table in a horizontal direction, a friction drive for said table associated with said last-named means, and a retarding device to prevent rotation of said table.

14. The combination with a slice-receiving table, of a pivotal support for said table, and a radius rod for controlling the position of said table upon its pivotal support.

15. The combination with a slicing machine, of a slice-receiving table therefor, a feed screw for moving said table in a vertical direction, and a radius rod connected with said table and slicing machine for controlling the horizontal position of said table relative to said feed screw.

In testimony whereof I have signed my name to this specification on this 8th day of June, A. D. 1922.

JOSEPH FOLK.